United States Patent [19]
Worrell

[11] Patent Number: 5,784,634
[45] Date of Patent: Jul. 21, 1998

[54] PIPELINED CPU WITH INSTRUCTION FETCH, EXECUTION AND WRITE BACK STAGES

[75] Inventor: Frank Worrell, San Jose, Calif.

[73] Assignee: LSI Logic Corporation, Milpitas, Calif.

[21] Appl. No.: 967,267

[22] Filed: Nov. 7, 1997

Related U.S. Application Data

[63] Continuation of Ser. No. 497,356, Jun. 30, 1995, abandoned.
[51] Int. Cl.$^6$ ................................................. G06F 15/76
[52] U.S. Cl. ................................. 395/800.01; 395/376
[58] Field of Search .......................... 395/800.01, 800.1, 395/800.23, 800.32, 376, 381, 384, 390, 561, 562; 364/131–134, 736.01, 736.05, 716.04

[56] References Cited

U.S. PATENT DOCUMENTS

| | | | |
|---|---|---|---|
| 5,450,555 | 9/1995 | Brown, III et al. | 395/375 |
| 5,461,715 | 10/1995 | Matsuo et al. | 395/375 |
| 5,497,355 | 3/1996 | Mills et al. | 365/230.08 |
| 5,553,256 | 9/1996 | Fetterman et al. | 395/375 |

*Primary Examiner*—Alpesh M. Shah
*Attorney, Agent, or Firm*—Townsend and Townsend and Crew LLP

[57] ABSTRACT

An integrated circuit CPU is provided. The CPU has a program counter register; an instruction register; an instruction decoder connected directly to the instruction register; a register file responsive to control signals from the instruction decoder; an ALU operating upon data from the register file and generating results responsive to the control signals; and a result register that holds results while the results are written back to the register file. The CPU has only three pipelined stages of operation. The three stages comprise fetching an instruction from the memory subsystem into the instruction register; executing an instruction in the instruction register; and writing back results in the result register to the register file. Operating speeds are comparable to CPUs with a greater number of stages.

9 Claims, 3 Drawing Sheets

PIPELINED CPU WITH INSTRUCTION FETCH, EXECUTION AND WRITE BACK STAGES

This is a Continuation of application Ser. No. 08/497,356, filed Jun. 30, 1995, now abandoned, the disclosure of which is incorporated by reference.

BACKGROUND OF THE INVENTION

The present invention is related to the field of microprocessor design and, more particularly, to the design of pipelined microprocessor CPUs.

In all microprocessors the operations of the CPU (Central Processing Unit) are basically the same. Instructions are fetched, issued, decoded, executed, and the results are written back into registers. In the execution of the instruction, typically the contents of one or more registers are read and operated upon as specified by the instruction. The results are then written back into a register, which is also specified by the instruction.

Thus the operation of the CPU for one instruction can take a significant amount of time from an electronic standpoint. Rather than waiting for the CPU to complete its operations for one instruction before the next instruction is issued, many microprocessors are pipelined so there are multiple stages of operation in the CPU. Each stage handles operations for one instruction and each instruction moves from one stage to another in a CPU clock cycle. An instruction is completed after going through all the stages of the pipeline. Ideally, one or more instructions are completed in each clock cycle so that while each instruction might take multiple clock cycles, the CPU handles at least one instruction per clock cycle. In this manner the operating speed of the microprocessor is enhanced.

A typical pipelined microprocessor has at least five stages. In order to increase clock frequency, advanced microprocessors have increased the number of stages in the pipeline.

The present invention moves in a contrary direction. By simplifying the CPU with a reduction in the number of stages in the pipeline, the CPU is not only cheaper to build, but surprisingly, is as fast or faster than a comparable CPU with a larger number of stages.

SUMMARY OF THE INVENTION

The present invention provides for a CPU in an integrated circuit. The CPU has a program counter register that holds the address of an instruction in memory while the instruction is fetched from the memory subsystem; an instruction register that holds an instruction; an instruction decoder connected directly to the instruction register, the decoder generating control signals responsive to the instruction in the instruction register; a register file responsive to the control signals; an ALU having at least two input terminals and an output terminal, ALU operating upon data from the register file and generating results responsive to the control signals; and a result register that holds results while the results are written back to the register file.

In this manner the CPU has only three pipelined stages of operation. The three stages comprise fetching an instruction from the memory subsystem into the instruction register; executing an instruction in the instruction register; and writing back results in the result register to the register file.

DETAILED DESCRIPTION OF PREFERRED EMBODIMENTS

The present invention minimizes the complex circuitry and bus routing found in a pipelined CPU. Each pipeline stage has a pipeline register and circuitry for the operation of the stage. Typically by-pass logic and routing is coupled with each stage to speed CPU operations. With such logic and routing, a CPU can obtain the results of a stage without waiting for passage through the remaining stages of the pipeline. Thus the elimination of a pipeline stage can save considerable space on an integrated circuit.

Figure 1:
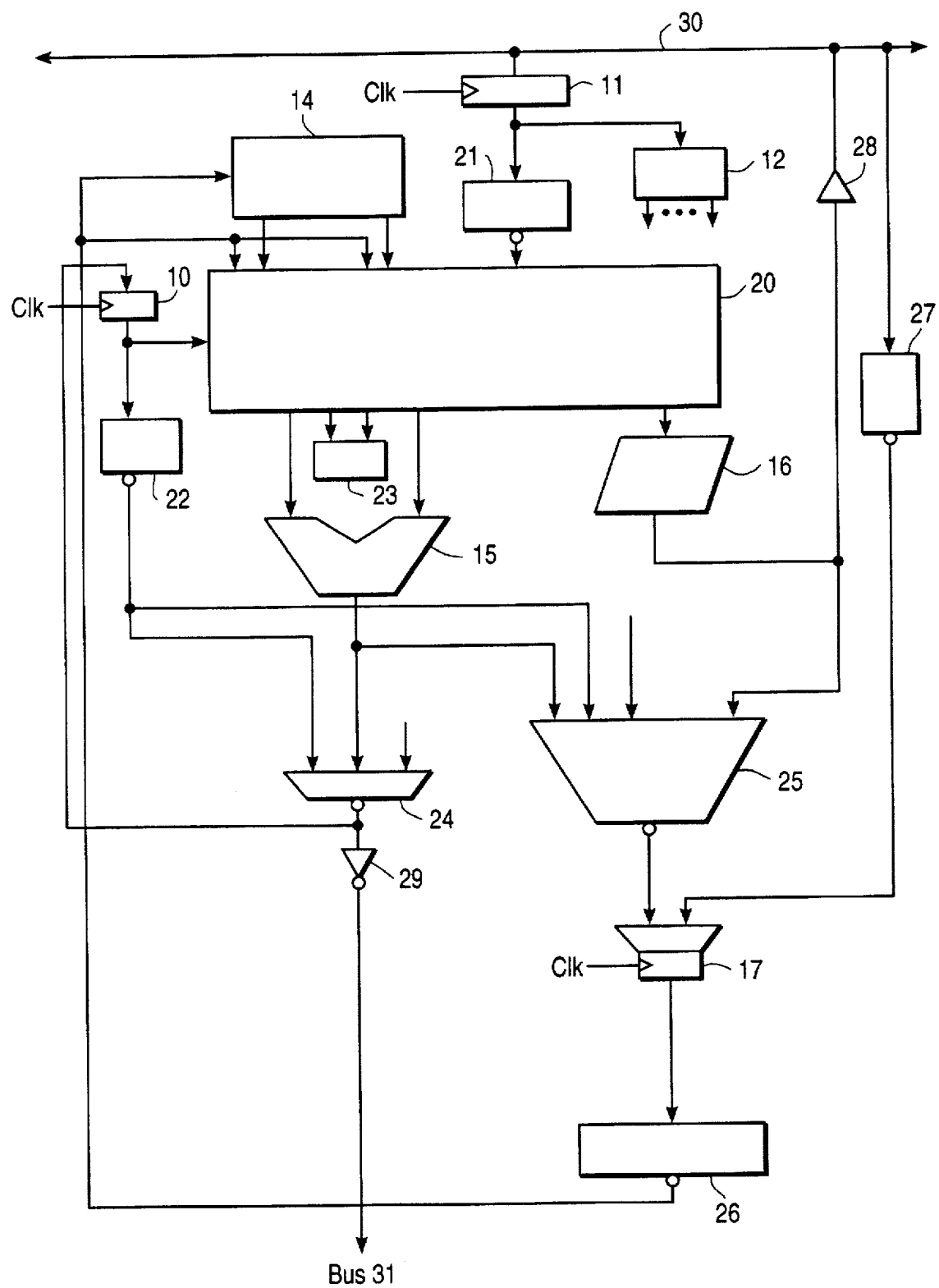
FIG. 1 is a block diagram of a CPU according to the present invention.

Minimization in accordance with the present invention further includes a reduction of the number of input/output busses found in a typical CPU. Only two main input/output busses are found in the CPU. FIG. 1 illustrates the organization of a CPU according to the present invention. One bus carries data and instructions, and a second bus carries addresses, both for data and instructions. In the drawings most of the lines represent 32-bit busses; a person skilled in the art of microprocessor design should know where the lines are otherwise from a reading of the text.

Furthermore, in the present invention's minimization a single ALU (which contains an adder) operates on data and calculates addresses for the data and instructions, rather than including a separate adder(s) to calculate addresses. It should also be noted that while the described CPU is adapted specifically to run MIPS-1 and MIPS-2 instruction sets, the CPU could be adapted for other instruction sets.

The CPU provides a data bus 30 for receiving instructions from, and transmitting data to and from, a memory subsystem (not shown). The data bus 30 drives the data inputs of a load data aligner 27 and an instruction register 11. The instruction register 11 sequentially receives and holds instructions from the memory subsystem. The instruction register 11 drives an instruction decoder 12 and an immediate data multiplexer 21. The immediate data multiplexer 21 extracts the immediate data field of an instruction.

An operand select block 20 selects operands from four sources: a program counter 10, bypassed results from a sign extender 26, the two read ports of a register file 14, or the immediate data multiplexer 21. The outputs of the operand select block 20 drive the operand inputs of an Arithmetic Logic Unit (ALU) 15, a compare block 23, and a shifter 16. The ALU 15 performs arithmetic and logic operations on its two operands and drives the result to the result multiplexer 25 and the address multiplexer 24. The compare block 23 performs compare operations, such as determining if its two operands are equal. The shifter 16 shifts the bits of its operand to different positions and drives the result to the result multiplexer 25 and a data out buffer 28. The data out buffer 28 drives output data to the data bus 30.

The result multiplexer 25 selects a result from one of four sources: an incrementer 22, the ALU 15, the shifter 16, or other source (not shown), which includes control registers (also not shown). The result register 17 selects a result from the result multiplexer 25 or the load data aligner 27 and drives the sign extender 26. The sign extender replicates the most significant bit of partial word data into the most significant bits of a full word and drives the result to the write port of the register file 14 and the operand select block 20.

The address multiplexer 24 selects an address from one of three sources: the incrementer 22, the ALU 15, or exception vector logic (not shown). The address multiplexer 24 drives the address buffer 29 and the program counter 10. The address buffer 29 drives the address bus 31 which transmits the address to the memory subsystem (not shown). The program counter 10 drives the incrementer 22 and the operand select block 20.

Figure 2:
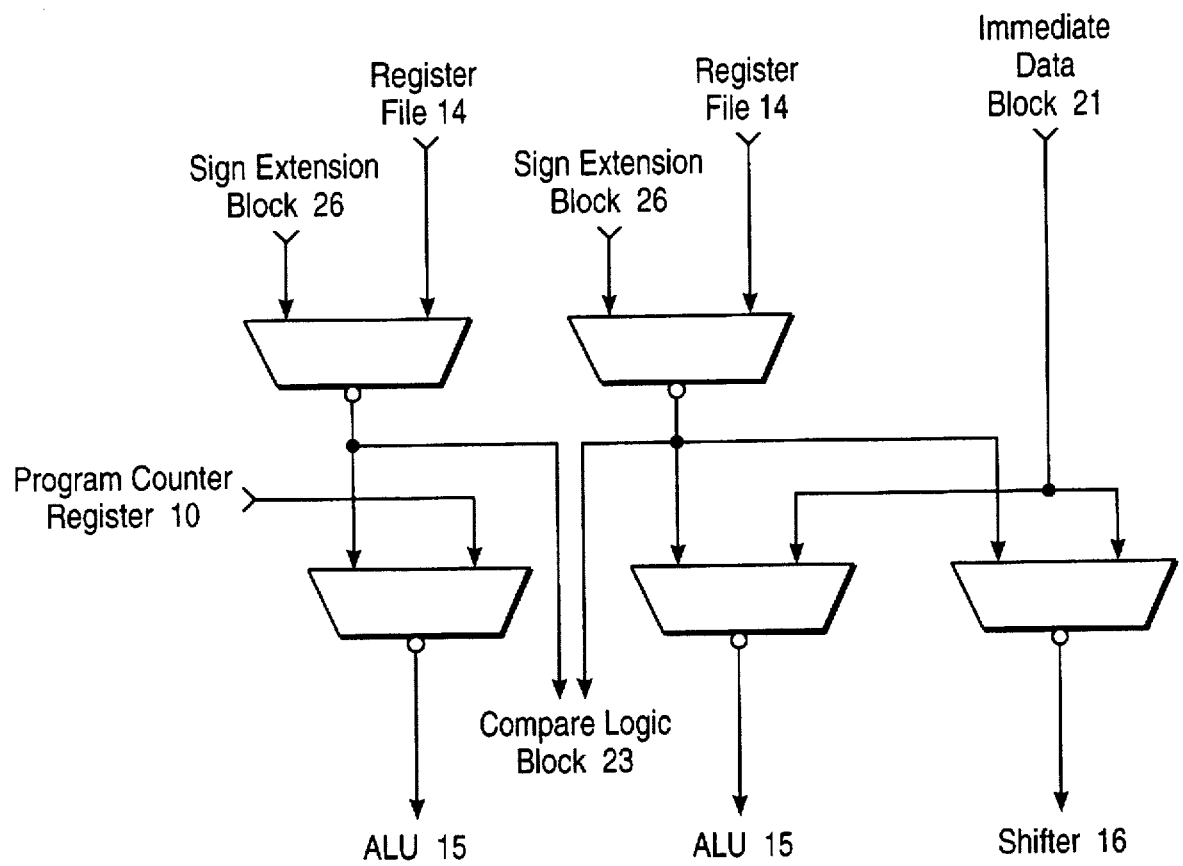
FIG. 2 is a block diagram of the operand select block in FIG. 1.

FIG. 2 illustrates the details of the operand select block 20. Each of the five multiplexers in the block 20 respond to control signals from the decoder 12 so that operands are routed as called for by the instruction in the instruction register 11.

A fetch operation is performed by driving the next instruction address on the address bus 31. The address on the address bus 31 points to a particular location in the memory subsystem, which holds the instructions. The addressed instruction is placed on the data bus 30 and transmitted to the input terminal of the instruction register 11. At the next clock cycle the fetched instruction is latched into the instruction register 11. At the same time, the incrementer block 22 increments the address in the program counter register 10. The incremented address appears at the input terminals of the program counter register 10 after being fed back through the address multiplexer 24. At the next clock cycle, the next incremented address is latched into the program counter register 10.

In the execution stage, the instruction in the instruction register 11 is fed to the decoder 12 and the register file 14. The data in the particular registers addressed by the instruction register 11 arrive at the input terminals of the ALU 15 after traveling through the operand select block 20. The ALU 15 or shifter 16 operates upon the data and the results pass through the result multiplexer 25 to the result register block 17.

For load or store operations, execution requires two clock cycles. In the first cycle, the ALU 15 determines the address. The address passes through the address multiplexer 24, the address buffer 29, and the address bus 31 to the memory subsystem. In the second cycle, CPU operations are stalled for a data transfer. For loads, the memory subsystem drives load data to the data bus 30. The data passes through the load aligner 27 and is captured and held in the results register 17. For stores, data passes through the shifter 16, the data out buffer 28, and the data bus 30 to the memory subsystem.

The write back operation is straightforward. The data in the results register 17 are stored into the register file 14 after passing through the sign extender block 26.

Figure 3:
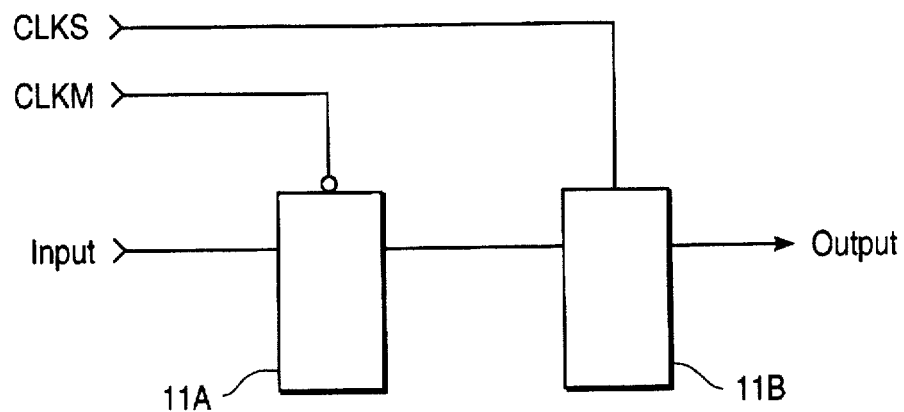
FIG. 3 illustrates the structure of the instruction register in FIG. 1.

To handle the extended execution times of the load and store operations, the instruction register 11 is composed of master and slave latches. FIG. 3 details the instruction register 11, composed of a master latch 11A and a slave latch 11B, connected to separate clock signals, CLKM and CLKS respectively, from a clock control element 40. (Only a single clock signal to the instruction register 11 is illustrated in FIG. 1 for purposes of explaining the general organization of the CPU.)

Figure 4A:
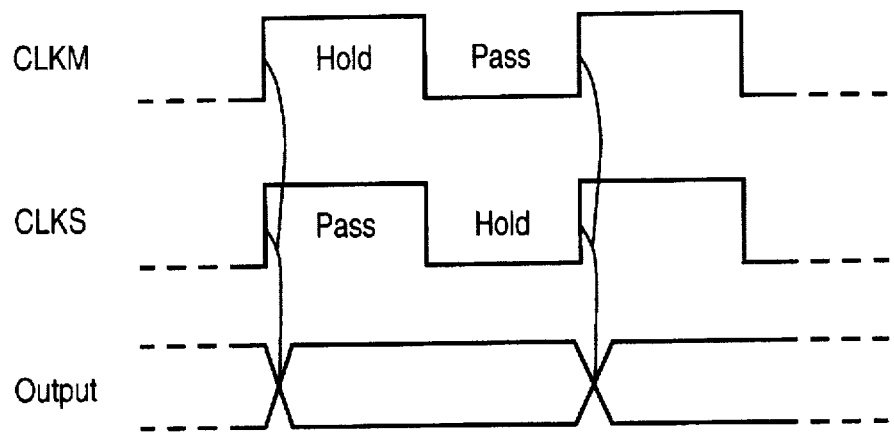
FIG. 4A illustrates the operation of the instruction register of FIG. 3 for an instruction execution requiring a single clock cycle.

Nearly all instructions require only one clock cycle to execute. For these instructions, the two clock signals, CLKM and CLKS, run together as illustrated in FIG. 4A. On the rising edge of the CLKM clock signal, the master latch 11A latches the instruction bits at the input terminals of the instruction register 11 and holds the bits during the positive portion of the clock signal. During the positive portion of the CLKS signal, the slave latch 11B passes through the instruction bits in the master latch so that the instruction bits appear at the output terminals of the register 11. After the falling edge of the CLKM clock signal, the master latch 11A releases the instruction bits; however, at the falling edge of the CLKS signal, the slave latch 11B latches the instruction bits from the master latch 11A and holds the bits during the negative portion of the CLKS clock cycle. The result is that the output signals of the instruction register 11, the instruction bits, remain unchanged over one cycle of the clock signal. The control signals from the instruction decoder 12 remains unchanged for the clock cycle.

Figure 4B:
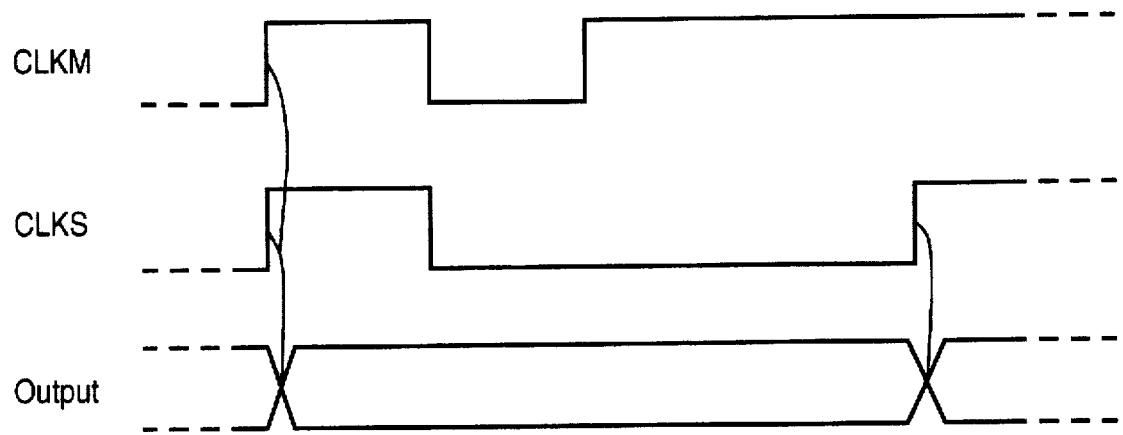
FIG. 4B illustrates the operation of the instruction register for an instruction execution requiring two clock cycles.

In the CPU described, two clock cycles are used in the execution of a load or store operation. FIG. 4B illustrates how the instruction register 11 maintains the instruction, load or store, for more than one clock cycle. At the initial rise of the CLKM clock signal, the master latch 11A latches the next instruction (load or store) into the master latch 11A and holds the instruction bits during the positive portion of initial clock cycle. At this point the CLKS clock signal coincides with the CLKM signal. The slave latch 11B passes the instruction bits held in the master latch 11A to the output terminals of the instruction register 11 during the positive portion of the CLKS clock cycle.

Then, as in the case of a single clock cycle instruction, the CLKM and CLKS clock signals fall. The master latch 11A releases the instruction bits and the slave latch 11B latches the instruction bits from the master latch 11A and holds the bits during the negative portion of the CLKS clock cycle. The output signals of the instruction register 11 remain unchanged over one cycle of the clock signal.

This first clock cycle is sufficient for the decoder 12 to issue control signals indicative of an instruction requiring more than one clock cycle to the clock control element 40. Besides "stall" control signals from the decoder 12, the result is that clock control element 40 causes the CLKM clock signal to go high and to remain high for the entire next clock cycle. The master latch 11A latches and holds the next instruction for this period. In contrast, the CLKS clock signal to the slave latch 11B remains low for the next clock cycle so that the slave latch 11B continues to hold the instruction bits of the first instruction until the load or store operation is completed. Then the CLKS clock signal goes high again at the beginning of the next clock cycle while the CLKM clock signal remains high. The slave latch 11B releases the load or store instruction bits and passes the instruction bits of the next instruction held by the master latch 11A for the execution of the next instruction.

Thus, the CPU has a simple three-stage pipeline of instruction fetch, instruction execution, and write back of the results. The three pipeline registers in the CPU are the program counter register 10 for the fetch stage, the instruction register 11 for the execution stage, and the results register 17 for the write back stage. Besides the registers in the register file 14, the CPU has only pipeline registers for a three-stage pipelined operation. Thus the connections between these registers are logical paths in which data may flow from one node to another through wiring or logic without passing through registers or latches.

A surprising result is that the CPU appears to be operationally at least as fast as a conventional five-stage pipelined CPU. It is believed that, with present bus widths of at least 32 bits, the elimination of pipeline stages and the attendant by-pass logic used in heavily pipelined CPUs to avoid waiting for results at the end of a long pipeline saves much more integrated circuit space than one might expect. Signal delays are consequently shortened considerably and the three-stage pipelined CPU has unexpectedly high operating speeds.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. In an integrated circuit a CPU comprising a program counter register for connection to a memory subsystem holding instructions for said CPU, said program counter register holding an address of an instruction in said memory subsystem for fetching said instruction from said memory unit;

an instruction register connected by a logic path to said memory unit for holding an instruction fetched from said memory unit;

an instruction decoder connected by a logic path to said instruction register, said decoder generating control signals responsive to said instruction in said instruction register;

a register file responsive to said control signals;

an ALU having at least two sets of input terminals and one set of output terminals, said two sets of input terminals connected by a logic path to said register file by first and second busses, said set of ALU output terminals connected by a logic path to said results register by a third bus, each of said buses comprising at least 32 bit lines, said ALU executing upon contents of said register file responsive to said control signals and generating results; and a results register connected by a logic path to said output terminals of said ALU to hold said results from said ALU, said results register connected by a logic path to said register file by which results in said results register are written back to said register file;

whereby said CPU has only three pipeline stages.

2. In an integrated circuit a CPU comprising a program counter register for connection to a memory subsystem holding instructions for said CPU, said program counter register holding an address of an instruction in said memory subsystem for fetching said instruction from said memory unit;

an instruction register connected by a logic path to said memory unit for holding an instruction fetched from said memory unit;

an instruction decoder connected by a logic path to said instruction register, said decoder generating control signals responsive to said instruction in said instruction register;

a register file responsive to said control signals;

an ALU having at least two sets of input terminals and one set of output terminals, said input terminals connected by a logic path to said register file, said ALU connected by a logic path to said instruction register and said program counter is connected by a logic path to said ALU so that said ALU can operate directly upon instructions and addresses for said CPU, said ALU executing upon contents of said register file responsive to said control signals and generating results; and a results register connected by a logic path to said output terminals of said ALU to hold said results from said ALU, said results register connected by a logic path to said register file by which results in said results register are written back to said register file;

whereby said CPU has only three pipeline stages.

3. The CPU of claim 2 wherein said instruction register is connected to said memory subsystem by a bus having at least 32 bit lines.

4. In an integrated circuit CPU having a program counter register connected to a memory subsystem holding instructions for said CPU, said program counter register holding an address of an instruction in said memory subsystem; an instruction register connected by a logic path to said memory subsystem for holding an instruction fetched from said memory subsystem responsive to an instruction address in said program counter register; an instruction decoder connected by a logic path to said instruction register, said decoder generating control signals responsive to said instruction in said instruction register; a register file having a plurality of registers responsive to said control signals; an ALU having at least two sets of input terminals and one set of output terminals, said two sets of input terminals connected by a logic path to said register file; and a results register connected by a logic path to said output terminals of said ALU, said ALU output register holding said results from said ALU; a method of operating said CPU comprising fetching a first instruction from said memory unit into instruction register responsive to said instruction address in said program counter register in a clock cycle;

executing a second instruction fetched immediately previously to said first instruction and placing said results in said ALU output register in said clock cycle, wherein said executing step includes transferring an instruction address from said program counter register to said ALU for operation thereupon;

writing results of a third instruction fetched immediately previously to said second instruction from said results register back into said register file in said clock cycle, wherein said writing results step includes writing back said operated upon instruction address to said program counter register subsequently;

whereby said CPU operates in three pipelined stages.

5. The method of claim 4 wherein said fetching step comprises fetching said first instruction at least 32 bits at a time.

6. The method of claim 4 wherein said executing step comprises transferring at least 32 bits at a time from one register in said register file to said ALU.

7. The method of claim 6 wherein said executing step comprises transferring at least 32 bits at a time from each of two registers in said register file to said ALU.

8. The method of claim 4 wherein said writing back step comprises transferring at least 32 bits at a time from said ALU output register to a register in said register file.

9. The method of claim 4 wherein said executing step comprises transferring at least a portion of an instruction from said instruction register to said ALU for an operation thereupon.

* * * * *